Figure 1:
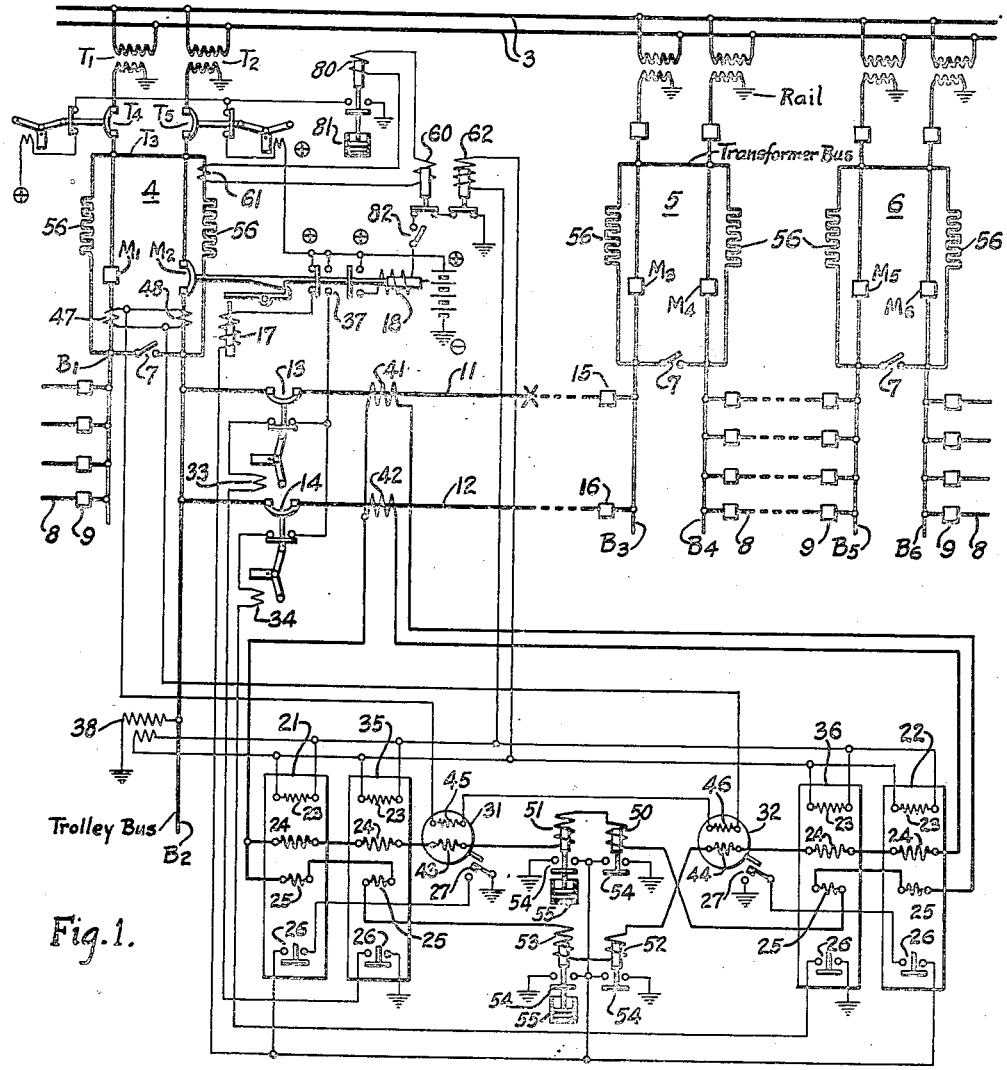

April 16, 1935.  R. D. EVANS ET AL  1,997,634

MASTER BREAKER PROTECTIVE SYSTEM

Filed Aug. 15, 1933

INVENTOR
Robert D. Evans and
Richard T. Earle
BY O. B. Buchanan
ATTORNEY

Patented Apr. 16, 1935

1,997,634

UNITED STATES PATENT OFFICE 1,997,634

MASTER BREAKER PROTECTIVE SYSTEM

Robert D. Evans, Swissvale, and Richard T. Earle, Wilkinsburg, Pa., assignors to Westinghouse Electric & Manufacturing Company, East Pittsburgh, Pa., a corporation of Pennsylvania Application August 15, 1933, Serial No. 685,240

10 Claims. (Cl. 175—294)

Our invention relates to a protective system which has been particularly designed for removing a fault from any one of a plurality of parallel trolley-sections, or other parallel feeders or line-sections.

The particular object of our invention is to achieve high-speed reduction or removal of the heavy fault current, without entailing the exceedingly high cost of making every one of the trolley breakers capable of handling the high fault currents and high-speed, and yet without tripping out the entire transportation system, or any material part of it, each time that a fault occurs on one of the trolley sections.

With the foregoing and other objects in view, we utilize, at every point where power is fed into a trolley conductor or trolley section, a trolley bus or buses, each one of which supplies current to two or three or four or five trolleys or trolley sections, or even more in case of unimportant stub-end trolleys for supplying tracks other than main-line tracks, at a railroad station, for example. Each one of the trolley buses is equipped with a high-speed master breaker or circuit-interrupter which is capable of handling the largest fault currents, and this master breaker is controlled by relays which are responsive to faults in the respective trolleys or trolley sections which are connected to the bus which is energized by said master breaker. When a fault occurs on any of these trolleys or trolley sections, the master breaker is tripped out very rapidly and subsequently the faulty line or trolley section is disconnected from the bus by means of its own trolley-breaker or circuit-interrupter which can be of much smaller current-interrupting capacity and, what is more important from a cost-standpoint, which may be relatively slow-speed in its operation.

In the case of doubly-fed trolley feeders, a plurality of which are bussed together at their respective ends, we utilize especially compensated impedance relays for controlling the master breaker at each end, and differently compensated impedance relays for controlling the individual trolley breakers. The impedance relays which control the master breaker are set with a balance point placed at 100% or slightly more than 100% of the length of the line-section, but these relays are somewhat sluggish when a fault is close to their balance point, so that they operate substantially instantaneously for faults up to as far as 90% of the distance to the end of the line-section, and somewhat slower for faults lying within the remaining 10% of the line-section. These relays are compensated so as to substantially exactly neutralize the effect of the mutual impedance between the parallel feeders or lines so that the location of the balance point of each relay will be independent of the number of trolley circuits in operation. On the other hand, the relays which control the individual trolley-breakers are either provided with no compensation at all, or with negative compensation for mutual impedance effects, so as to enhance the effect of mutual impedance, which means that these relays may be set sufficiently accurately to operate substantially instantaneously for faults up to 90% of the length of the trolley-section, and not at all for faults beyond that point, until after the trolley-breaker at the far end of the trolley-section has been tripped, whereupon the compensation effects, as well as the effects of mutual empedance, reverse, so as to move the balance point further away from the relay, instead of closer to the relay, thus causing the relays to pick-up even for faults further away than 90% of the length of the trolley-section.

In order to obtain current for energizing the relays which control the trolley-breakers, after the corresponding master breakers have been opened, it may be desired, particularly in the case of doubly-fed trolley-feeders, to utilize shunting resistances across the master breakers, so that the fault-current is reduced, say, to currents of the same order of magnitude as load-currents, which are not particularly objectionable from the standpoint of inductive interference in neighboring communicating circuits, so that it is quite satisfactory for these low-magnitude currents to be tripped out more slowly by the relatively slowly operating trolley-breaker. To guard against the possibility of the failure of a trolley-breaker to open, we may also provide means for eventually disconnecting the power supply to the master breaker and its shunting resistor.

Figure 2:
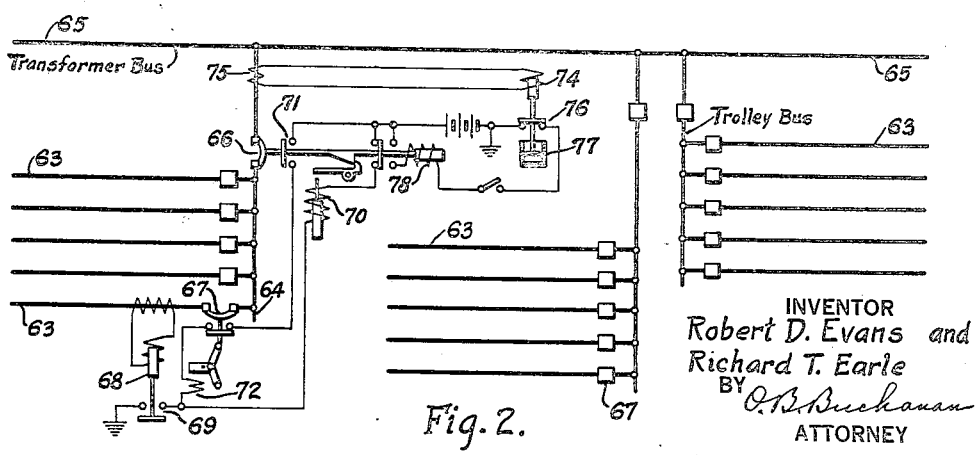

With the foregoing and other objects in view, our invention consists in the circuits, apparatus and methods hereinafter described and claimed and illustrated in the accompanying drawing, wherein Figure 1 is a diagrammatic view of circuits and apparatus embodying our invention in a form which is particularly applicable to doubly-fed trolley-sections, and Fig. 2 is a similar view showing a form of embodiment of our invention which is particularly applicable to stub-end trolley-lines, as in a station yard where a large number of short spur tracks are employed.

Fig. 1 shows our invention as being applied to an alternating-current railway system in which relatively high-voltage electric power is supplied, over a single-phase power line 3, to a plurality of spaced transforming stations 4, 5 and 6. Each transforming station is illustrated as comprising two step-down transformers $T_1$, $T_2$, which are connected to a transformer bus $T_3$ by means of breakers or circuit interrupters $T_4$ and $T_5$ respectively. The transformer bus $T_3$ at each station, for example the station 4, supplies current to two trolley buses $B_1$ and $B_2$ through master circuit breakers $M_1$ and $M_2$ respectively. If desired, the two trolley buses $B_1$ and $B_2$ at any station may be connected together by means of a disconnect switch 7. For convenience in discussion, we have given different reference characters to the master breakers and trolley buses at the different stations 4, 5 and 6, the master breakers being designated as $M_1$ and $M_2$ at station 4, as $M_3$ and $M_4$ at station 5, and as $M_5$ and $M_6$ at station 6. The trolley buses are designated as $B_1$ and $B_2$ at station 4, as $B_3$ and $B_4$ at station 5 and as $B_5$ and $B_6$ at station 6.

Each trolley bus supplies current to a plurality of trolleys or trolley-sections or lines. Four such lines are connected to the buses $B_1$, $B_4$, $B_5$ and $B_6$, as indicated at 8, each trolley being provided at each end with its own individual trolley breaker 9. For convenience in illustration, and in order to simplify the drawing, the trolley buses $B_2$ and $B_3$ have been illustrated as being connected to the opposite ends of only two trolley lines designated as 11 and 12, the bus $B_2$ being connected to the left-hand ends of trolleys 11 and 12 through trolley breakers 13 and 14 respectively, whereas the bus $B_3$ is connected to the right-hand ends of the trolleys 11 and 12 through trolley breakers 15 and 16 respectively.

Suitable relaying equipment is associated with each one of the master breakers and trolley breakers. As the equipment for the various stations is duplicated, we have indicated in detail the relaying equipment for only the two trolleys 11 and 12. The breakers for which the relaying equipment is not shown in detail are indicated in the drawing by small squares, as is common in single-line transmission system diagrams. These squares are supposed to represent suitable circuit breakers and relaying or control equipment therefor, for interrupting the lines at the points indicated by the squares.

The master breaker $M_2$ at station 4 is provided with a trip coil 17 and a closing coil 18. The trip coil 17 of the master breaker is controlled primarily by means of impedance relays 21 and 22 which are connected respectively so as to respond to the impedances of the trolley circuits 11 and 12. As all of the impedance relays are alike, one description will suffice for all. Each impedance relay is provided with a voltage coil 23, a main current coil 24, one or more auxiliary current coils 25, equal to the number of additional trolley-lines for which compensation is desired, and relay contacts 26.

The relay contacts 26 of the master-breaker impedance relays 21 and 22 are adapted to energize the trip coil 17 of the master breaker, in series with additional relay contacts 27 of directional relays 31 and 32 respectively, so that the master breaker $M_2$ may be tripped only when the direction of current-flow is from the bus $B_2$ into the trolley 11 or 12, as the case may be.

The trolley breakers 13 and 14 are provided with trip coils 33 and 34 respectively, which are controlled, respectively, by means of impedance relays 35 and 36. The circuits for the trip coils 33 and 34 of the trolley-breakers are not completed, however, until the closing of an auxiliary back-contact 37 on the master breaker $M_2$, so as to ensure that the master breaker is opened before either one of the trolley breakers 13 or 14 is tripped.

The voltage coils 23 of the impedance relays 21, 22, 35 and 36 are energized in accordance with the potential of the bus $B_2$, by means of a potential transformer 38. The main current coils 24 of the impedance relays 21 and 35 which are responsive to the impedance of the trolley-line 11 are connected in series with the auxiliary current coils 25 of the other two impedance relays 22 and 36, and energized from a current transformer 41 in the trolley-section 11. The main current coils 24 of the two impedance relays 22 and 36 which are responsive to the impedance of the second trolley-section 12 are connected in series with the auxiliary current coils of the other two impedance relays and energized from a current transformer 42 in said trolley-section 12.

The directional relays 31 and 32 are provided with current coils 43 and 44 respectively, which are energized in series with the circuits of the current transformers 41 and 42 respectively. The directional relays 31 and 32 are also provided with "voltage" coils 45 and 46 respectively, which are coils adapted to be energized by an electrical quantity which remains relatively unchanged, regardless of the direction of current-flow in the respective trolleys 11 and 12, so that a means will be afforded whereby the direction of the trolley currents may be compared to a constant standard. In the particular form of embodiment illustrated in the drawing, these comparison coils 45 and 46 are energized in accordance with the direction of current-flow in the trolley bus $B_2$, or in both the trolley buses $B_1$ and $B_2$ at station 4, by means of current transformers 47 and 48.

The master-breaker impedance relays 21 and 22 are compensated in such manner as to substantially neutralize the effect of mutual impedance between the various trolley wires 11 and 12 in parallel, in accordance with the principles set forth in a patent to W. A. Lewis, No. 1,897,022, February 7, 1933. To this end, the auxiliary current coil 25 is provided with the proper number of turns, smaller than the number of turns in the main current coil 24, so as to substantially neutralize the coupling effect between the two trolleys 11 and 12. The effects of the currents in the main and auxiliary current coils 24 and 25 of these master-breaker impedance relays 21 and 22 is such that the two effects add together when both trolley currents are flowing in a direction away from the bus out into the trolley, and both effects are in a direction tending to close the relay contacts 26, this action being opposed by the voltage coil 23.

It will be understood that, in general, there will or may be more than two trolleys 11 and 12 in parallel, in which case more than one auxiliary current coil 25 will be provided, so that allowance will be made for the mutual coupling between the trolley whose impedance is being measured and each one of the parallel-connected trolleys. The design or adjustment is such that the master-breaker impedance relays 21 and 22 will indicate or respond to the true impedance of the trolley-line to which its main current coil is connected, regardless of whether any current is flowing in any other parallel-connected trolley-line or not.

The setting of the master-breaker impedance relays 21 and 22 is such that the balance point of the relays is at about 100%, or even more than 100%, of the length of the trolley-section between the buses $B_2$ and $B_3$, but the relays are somewhat sluggish in their action when the faults are within about 10% of the distance up to the balance point of the relay, so that substantially instantaneous operation is obtained only for faults up to about 90% of the distance from the bus $B_2$ to the bus $B_3$.

The trolley-breaker impedance relays 35 and 36 are "compensated" in such manner that when the trolley currents are both flowing in the direction away from the bus $B_2$ out into the trolley conductors 11 and 12, the main and compensating current-coils 24 and 25 of the impedance relays 35 and 36 will oppose each other, so that the effect of the auxiliary current-coil 25 is to move the balance point of the relay closer in on the line, under these conditions, as set forth in a patent to R. D. Evans, No. 1,896,773, February 7, 1933. The effect of this "compensation" is to augment the mutual impedance effects between the parallel-connected trolley-conductors, so that, when a plurality of trolley conductors are connected in parallel, the apparent impedance which is measured by the relay will begin to sharply increase as the location of the fault is moved further out on the trolley and begins to approach the end of the trolley at the far-end bus $B_3$, as indicated in Fig. 6 of the Evans patent. This makes it easier to set the impedance relays accurately to respond to faults up to say about 90% of the length of the line, but no further. This is necessary or desirable because if a relay responds to a fault further than 100% of the length of the line, it means that the relay is responding to a fault in one of the parallel-connected lines, or to some other line connected to the far-end bus $B_3$. The trolley breakers 13 and 14 cannot be permitted to trip for any faults except faults in the particular trolley-line supplied by the respective breakers 13 and 14, so that the trolley-breaker impedance relays 35 and 36 must be so set or adjusted that they will not pick up for faults located at a distance of more than 100% of the trolley-section from the relaying point. In order to provide some margin of safety, the balance point is usually set at about 80%, or less, in an uncompensated relay, but by our "compensation" as just described, we can safely set our relays as high as 90% of the length of the line-section.

Ordinarily, certain back-up protection will also be provided. In the embodiment of our invention shown in Fig. 1, this back-up protection is shown as being applied to the means for tripping the master breaker $M_2$. This back-up protection is afforded by means of two over-current relays 50 and 51 energized in accordance with the current in trolley 11 and two other over-current relays 52 and 53 energized in accordance with the current in trolley 12. These relays have relay-contacts 54 which, when closed, serve to energize the tripping coil 17 of the master breaker $M_2$. The over-current relays 50 and 52 operate substantially instantaneously, but respond only to very high over-currents. The over-current relays 51 and 52 operate after a slight time delay which may be afforded by a dashpot 55 or equivalent means, and they respond to somewhat smaller over-currents than the relays 50 and 52.

In order to provide energy for the actuation of the trolley-breaker impedance relays 35 and 36 after the master breaker $M_2$ is opened, we prefer to bypass each master breaker by means of a resistance 56, which reduces the short-circuit current or fault current to any convenient value, preferably not exceeding full-load current on any one of the trolleys 11 or 12.

It is a desirable feature of our invention that means shall be provided for automatically reclosing the master breaker $M_2$ so as to restore service on the sound trolley or trolleys as soon as possible after the segregation of the faulty trolley by means of trolley-breakers 13 and 15 or 14 and 16 as the case may be.

As a convenient means to this end, we have illustrated means for responding to the current flowing in the resistance 56 shunting the master breaker $M_2$, as well as means responsive to the voltage on the trolley bus $B_2$. The first means is an under-current relay 60 which is energized from a current transformer 61 in circuit with the resistance 56, and the second means is an under-voltage relay 62 which is energized from the potential transformer 38. Until the opening of the trolley-breaker 13 or 14 which is in series with the fault on the trolley 11 or 12, as the case may be, the fault-current flows through the resistance 56, thus holding the under-current relay 60 open. When the fault is cleared by the opening of the appropriate breaker 13 or 14, the under-current relay 60 drops, and it is usually safe then to reclose the master breaker $M_2$. As an additional safeguard, however, we have shown also the under-voltage relay 62 which is so adjusted that it will drop out its contacts in response to the insertion of the resistance 56 in series with the buses $B_2$ and $B_3$ at both ends of the faulty trolley-section, the voltage-drop through these resistors being sufficient to cause the actuation of the under-voltage relay. There is an inherent sluggishness in the dropping of the armature of any under-voltage relay, and this may be easily enhanced, if necessary, by appropriate design, so as to afford a time delay so as to allow sufficient time for the trolley breakers to operate.

The operation of the master breakers and the trolley-breakers will now be described. For any fault lying between 10% and 90% of the length of either trolley-section 11 or 12, both ends of the section will be cleared simultaneously. Assuming the fault to be in the first trolley-line 11, the impedance relays 21 and 35 whose main current windings 24 are actuated in response to the current in this trolley-line will both back up instantaneously, closing their contacts 26, and the other two impedance relays 22 and 36 will both remain unactuated. At the same time, the directional relay 31 whose current coil 43 is in series with the faulty line will operate to close its contacts 27. The other directional relay 32 may or may not operate according as the fault in the line 11 is to the right or left of the center of the line, but this is immaterial because the impedance relay 22, which is in series with it, remains unactuated.

The impedance relay 21 and directional relay 31 operate together to energize the trip coil 17 of the master breaker $M_2$, and a similar action at the other end of the line also results in the simultaneous tripping of the master breaker $M_3$.

As soon as the master breaker $M_2$ opens, it closes its auxiliary contact 37, which makes it possible to trip the trolley breakers 13 and 14 if their associated impedance relays 35 or 36 are actuated. It will be observed that the impedance relay 35 is actuated but the impedance relay 36 is not, so that the trolley-breaker 13 will be tripped out as is desired. At the same time a corresponding action at the other end results in the tripping of the trolley-breaker 15.

The master breaker $M_2$ immediately thereafter recloses by means of the deenergization of the under-current and under-voltage relays 60 and 62 which causes the energization of the closing coil 18 of the master breaker $M_2$. A similar operation at the other end results in the reclosure of the master breaker $M_3$, thus restoring the sound trolley 12 to service, after only a very brief time of disconnection.

In case the fault occurred out of the simultaneous operational zone as just described, a kind of sequential operation will result, although the delay in opening the trolley breaker which is furthest from the fault will be very much less than the time necessary to bring about the opening of the trolley breaker which is closest to the fault. For example, if the fault occurs on the first trolley-line 11 at a point close to the far-end bus $B_3$, as indicated at X, the trolley-breaker impedance relays 35 and 36 at the relaying station 4 will not operate, because the fault is more than 90% of the length of the line-section from the bus $B_2$. The master-breaker impedance-relay 21 at the relaying station 4 will pick up but only rather slowly, because the fault is very close to the balance point of the relay, and the corresponding relay 22 in the trolley line 12 may also pick up, but usually in a time which is somewhat longer than the relay 21 in the faulty conductor. At the other end of the line, however, at the relaying station 5 which is close to the fault, the master-breaker impedance relay corresponding to 21 will pick up instantaneously, because the fault is very close to the relay. The directional relay 31 associated with the faulty line 11 will, of course, close its contacts, as well as the corresponding relay at the far end of the line, with the result that the master-breaker $M_3$ which supplies energy to the bus $B_3$ at the station 5 will open at high speed. The master breaker $M_4$ in the bus $B_4$ at station 5 cannot trip, even though the corresponding master-breaker impedance relays in all of the trolleys 8 between the buses $B_4$ and $B_5$ will pick up, because the corresponding directional relays at this location will not close their contacts. At the relaying station 6, the impedance relays which control the master breaker $M_5$ might possibly start to pick up their contacts, and the corresponding directional relays will also be energized, but the actuation of the impedance relays will be sluggish because the fault is more than 100% of the length of a line section away from the master breaker $M_5$, so that the master-breaker $M_3$ will open before the master breaker $M_5$ can be tripped. The opening of the master-breaker $M_3$ will instantly stop the energization of the impedance relays which control the master breaker $M_5$, so that the latter is not tripped.

In the faulty line-section 11, it will be noted, therefore, that the master-breaker $M_3$ at the end nearest the fault is opened substantially instantaneously, the master breaker having a speed which may be as high as one-half cycle on a twenty-five cycle supply system. As most of the energy which is supplied to the fault is supplied from the bus $B_3$ which is closest to the fault, the opening of the master-breaker $M_3$ instantly removes most of the effect of the short circuit from the entire electrical system as represented by the high-voltage line 3, so that the voltage rises at the bus $B_2$ at station 4, even though the fault still remains on the trolley line 11. While the master breaker $M_3$ was opening, the sluggish-acting impedance relay 21 at the station 4 may have completed its closing movement and energize the tripping coil 17 of the master breaker $M_2$. If this had not happened, however, the instantaneously operating over-current relay 50 would immediately pick up, due to the sudden rise in system voltage when the fault was partially removed from the system by the master breaker $M_3$, so that the master breaker $M_2$ would be instantaneously tripped as soon as the master breaker $M_3$ had completed its opening operation, even though the master breaker $M_2$ had not been tripped while the master breaker $M_3$ was in the process of opening.

The trolley breaker 15 closest to the fault would trip instantly as soon as the master breaker $M_3$ opened its contacts, because the impedance relay which controls the trolley breaker 15 would have its contacts closed. The trolley breaker 16 would not be tripped because the fault-current flowing in the sound trolley 12 from the bus $B_2$ would be that corresponding to a distance of over 100% of the length of a trolley-section, so that this impedance relay would not pick up, being set for a balance point of 90%.

At the station 4, the effect of our special "compensation" of the trolley-breaker impedance relays 35 and 36 will now be observed. As soon as the trolley breaker 15 at the far end of the faulty section 11 opens, current can no longer be fed to the fault X over the sound trolley 12 from the bus $B_2$. On the contrary, current will now be fed to the fault X from the bus $B_3$ through the resistor 56 which shunts the master breaker $M^3$, and this current will flow in a reverse direction over the sound trolley 12, entering the bus $B_2$ and continuing back along the faulty conductor 11 to the fault. The reversal of current in the sound trolley 12 will reverse the effect of the compensation so that the main and auxiliary current coils 24 and 25 in both of the trolley-breaker impedance relays 35 and 36 will assist each other, trying to close the relay contacts 26 against the opposition of the respective voltage coils 23. The trolley current in the faulty trolley 11, however, will be much larger than the trolley current in the sound trolley 12, so that the relay 35 will be much more strongly actuated in the contact-closing direction than the relay 36, and the settings of the relays are so adjusted that the relay 35 picks up its contacts under these conditions while the relay 36 does not. Hence the trolley breaker 13 in the faulty trolley 11 is tripped, while the other trolley breaker 14 remains closed.

The reclosing of the master breakers $M_2$ and $M_3$ then follow in the manner previously described. In the event of a failure of the trolley breaker 13 to open, current would continue to flow through the resistor 56, which would quickly burn out the resistor. In order to avoid this, the transformer breakers $T_4$ and $T_5$ may be tripped in response to an over-current relay 80 which responds to the current in the resistor 56, being energized from the current transformer 61, and responding sluggishly because of a dashpot 81 which is set to have a time delay longer than any of the other time delays in our system.

In order to prevent the automatic reclosure of the master breaker M₂ when it is desired to work on the bus B₂ or on the trolley conductors connected thereto, the closing-coil circuit may be broken by means of a manually operated switch 82.

Fig. 2 shows an embodiment of our invention which is particularly applicable to station yards where there are a very large number of short track stubs which are usually supplied from stub-end trolleys or feeders such as are indicated at 63. In accordance with our invention, these stub-end feeders are divided into groups of a small number of feeders each, each group being equipped with a trolley bus 64 which is connected to the transformer bus 65 by means of a master breaker 66. The individual trolleys 63 are provided with trolley breakers 67, only one of which is shown in detail, each breaker being controlled by means of an over-current relay 68 which picks up on the occurrence of a fault and closes its contact 69 to energize first the trip coil 70 of the master breaker 66 and subsequently, in response to a closure of a back contact 71 on the master breaker, the trip coil 72 of the trolley breaker 67 is then energized so as to trip out the trolley breaker.

When the master breaker 66 trips out, the current ceases to flow from the transformer bus 65 to the trolley bus 64 and this fact is caused to result in the deenergization of an under-current relay 74 which is energized from a current transformer 75 in series with the master breaker 66. The under-current relay 74 thereupon drops its contact 76 slowly, because of a dashpot 77 which is provided, so that the contacts 76 are not closed until sufficient time has been afforded to permit the opening of the trolley breaker 67 in the faulty trolley. The closure of the under-current relay contact 76 is utilized to energize the closing coil 78 of the master breaker 66. In this embodiment of our invention, it is not necessary to utilize the shunting resistor which is connected across the master breakers in the embodiment shown in Fig. 1.

It will be understood that any one of the trolley-lines or feeders 63 in Fig. 2 may supply current to a plurality of tracks or sidings, so that, in the event of a fault thereon, after our protective system has operated as hereinabove described, the particular part of the feeder that is faulted may be manually disconnected from the rest of the feeder, so that the latter may be then reconnected to its bus 64.

While we have described our invention in two preferred forms of embodiment, we desire such description, and the accompanying illustration, to be regarded as being only exemplary and we desire that the accompanying claims shall be accorded the broadest construction consistent with their language and the prior art.

We claim as our invention:

1. An electric supply system comprising a plurality of feeder-sections into which power is fed at both ends, a common feeder-bus at each end for supplying power to all of a plurality of feeder-sections, a master circuit-interrupter for each bus for controlling the power supply to its associated bus, a plurality of feeder circuit-interrupters for controlling the power supply to said plurality of feeder-sections at each end thereof, relaying means responsive to a fault on any one of the feeder-sections for effecting the opening of both master circuit-interrupters at the two ends of the faulty feeder-section, relaying means selectively responsive to the particular feeder on which the fault is located, and effectively operated after its associated master circuit-interrupter has had time to open, for effecting the opening of the particular feeder circuit-interrupter which supplies energy to the faulty feeder, and relaying means responsive to the removal of power from both ends of the faulty feeder-section, and effectively operated after both feeder circuit interrupters have had time to open, for subsequently automatically reclosing the master circuit-interrupter.

2. An electric supply system comprising a plurality of feeder-sections into which power is fed at both ends, a common feeder-bus at each end for supplying power to all of a plurality of feeder-sections, an impedance device for each bus and a high-speed master circuit-interrupter for each bus, each master circuit-interrupter normally short-circuiting its associated impedance device for controlling the power supply to its associated bus, a plurality of feeder circuit-interrupters for controlling the power supply to said plurality of feeder-sections at each end thereof, feeder-impedance-responsive relaying means at each end of each feeder-section for controlling the associated master circuit-interrupter, said relaying means being so connected and designed as to be substantially unaffected by mutual induction from other parallel feeder-sections, and substantially instantaneous in operation for all faults up to a point close to the far end of the feeder-section, responding to faults beyond said point but taking longer to respond thereto than to the nearer faults, and relaying means selectively responsive to the particular feeder on which the fault is located, and effectively operated after its associated master circuit-interrupter has had time to open, for effecting the opening of the particular feeder circuit-interrupter which supplies energy to the faulty feeder-section.

3. An electric supply system comprising a plurality of feeder-sections into which power is fed at both ends, a common feeder-bus at each end for supplying power to all of a plurality of feeder-sections, an impedance device for each bus and a high-speed master circuit-interrupter for each bus, each master circuit-interrupter normally short-circuiting its associated impedance device for controlling the power supply to its associated bus, a plurality of feeder circuit-interrupters for controlling the power supply to said plurality of feeder-sections at each end thereof, relaying means responsive to a fault on any one of the feeder-sections for effecting the opening of both master circuit-interrupters at the two ends of the faulty feeder-section and feeder-impedance-responsive relaying means at each end of each feeder-section for controlling the associated feeder circuit-interrupter, said last-mentioned relaying means being so connected and designed with such mutual coupling that its balance point is moved away from the relay when the current in the faulted feeder-section is away from the bus and the current in the parallel-connected sound feeder-section or sections is toward the bus.

4. An electric supply system comprising a plurality of feeder-sections into which power is fed at both ends, a common feeder-bus at each end for supplying power to all of a plurality of feeder-sections, an impedance device for each bus and a high-speed master circuit-interrupter for each bus, each master circuit-interrupter normally short-circuiting its associated impedance device for controlling the power supply to its associated bus, a plurality of feeder circuit-interrupters for controlling the power supply to said plurality of feeder-sections at each end thereof, feeder-impedance-responsive relaying means at each end of each feeder-section for controlling the associated master circuit-interrupter, said relaying means being so connected and designed as to be substantially unaffected by mutual induction from other parallel feeder-sections, and substantially instantaneous in operation for all faults up to a point close to the far end of the feeder-section, responding to faults beyond said point but taking longer to respond thereto than to the nearer faults, and other feeder-impedance-responsive relaying means at each end of each feeder-section for controlling the associated feeder circuit-interrupter, said last-mentioned relaying means being so connected and designed with such mutual coupling that its balance point is moved away from the relay when the current in the faulted feeder-section is away from the bus and the current in the parallel-connected sound feeder-section or sections is toward the bus.

5. In combination, an electric power line, a plurality of spaced switching stations associated therewith, a plurality of feeder-buses disposed in a plurality of said stations, a plurality of feeders, each one of a plurality of said feeder-buses supplying a plurality of said feeders, a plurality of feeders being connected in parallel between two feeder-buses, an impedance device for each of a plurality of feeder-buses, including the two last-mentioned feeder-buses and a high-speed master circuit-interrupter for each of said feeder-buses, each master circuit-interrupter normally short-circuiting its associated impedance device for controlling the power supply to its associated feeder-bus, at least one of said stations having a plurality of said feeder-buses each having its own impedance device and master circuit-interrupter, said last-mentioned feeder-buses being connected together on the power-line side of said last-mentioned impedance devices and master circuit-interrupters, a plurality of feeder circuit-interrupters for controlling the power supply to a plurality of feeders, and relaying means responsive to a fault on any one of the feeders which are connected to a given bus for effecting the opening of first the master circuit-interrupter and then the particular feeder circuit-interrupter which supplies energy to the faulty feeder.

6. In combination, an electric power line, a plurality of spaced switching stations associated therewith, a plurality of feeder-buses disposed in a plurality of said stations, a plurality of feeders, each one of a plurality of said feeder-buses supplying a plurality of said feeders, a plurality of feeders being connected in parallel between two feeder-buses, an impedance device for each of a plurality of feeder-buses, including the two last-mentioned feeder-buses, and a high-speed master circuit-interrupter for each of said feeder-buses, each master circuit-interrupter normally short-circuiting its associated impedance device for controlling the power supply to its associated feeder-bus, at least one of said stations having a plurality of said feeder-buses each having its own impedance device and master circuit-interrupter, said last-mentioned feeder-buses being connected together on the power-line side of said last-mentioned impedance devices and master circuit-interrupters, feeder-impedance-responsive relaying means at each end of each feeder-section for controlling the associated master circuit-interrupter, said relaying means being so connected and designed as to be substantially unaffected by mutual induction from other parallel feeder-sections, and substantially instantaneous in operation for all faults up to a point close to the far end of the feeder-section, responding to faults beyond said point but taking longer to respond thereto than to the nearer faults, and relaying means selectively responsive to the particular feeder on which the fault is located, and effectively operated after its associated master circuit-interrupter has had time to open, for effecting the opening of the particular feeder circuit-interrupter which supplies energy to the faulty feeder-section.

7. In combination, an electric power line, a plurality of spaced switching stations associated therewith, a plurality of feeder-buses disposed in a plurality of said stations, a plurality of feeders, each one of a plurality of said feeder-buses supplying a plurality of said feeders, a plurality of feeders being connected in parallel between two feeder-buses, an impedance device for each of a plurality of feeder-buses, including the two last-mentioned feeder buses, and a high-speed master circuit-interrupter for each of said feeder-buses each master circuit interrupter normally short-circuiting its associated impedance device for controlling the power supply to its associated feeder-bus, at least one of said stations having a plurality of said feeder-buses each having its own impedance device and master circuit-interrupter, said last-mentioned feeder-buses being connected together on the power-line side of said last-mentioned impedance devices and master circuit-interrupters, relaying means responsive to a fault on any one of the feeder-sections for effecting the opening of both master circuit-interrupters at the two ends of the faulty feeder-section, and feeder-impedance-responsive relaying means at each end of each feeder-section for controlling the associated feeder circuit-interrupter, said last-mentioned relaying means being so connected and designed with such mutual coupling that its balance point is moved away from the relay when the current in the faulted feeder-section is away from the bus and the current in the parallel-connected sound feeder-section or sections is toward the bus.

8. In combination, an electric power line, a plurality of spaced switching stations associated therewith, a plurality of feeder-buses disposed in a plurality of said stations, a plurality of feeders, each one of a plurality of said feeder-buses supplying a plurality of said feeders, a plurality of feeders being connected in parallel between two feeder-buses, an impedance device for each of a plurality of feeder-buses, including the two last-mentioned feeder-buses, and a high-speed master circuit-interrupter for each of said feeder-buses, each master circuit-interrupter normally short-circuiting its associated impedance device for controlling the power supply to its associated feeder-bus, at least one of said stations having a plurality of said feeder-buses each having its own impedance device and master circuit-interrupted, said last-mentioned feeder-buses being connected together on the power-line side of said last-mentioned impedance devices and master circuit-interrupters, feeder-impedance responsive relaying means at each end of each feeder-section for controlling the associated master circuit-interrupter, said relaying means being so connected and designed as to be substantially unaffected by mutual induction from other parallel feeder-sections, and substantially instantaneous in operation for all faults up to a point close to the far end of the feeder-section, responding to faults beyond said point but taking longer to respond thereto than to the nearer faults, and other feeder-impedance-responsive relaying means at each end of each feeder-section for controlling the associated feeder circuit-interrupter, said last-mentioned relaying means being so connected and designed with such mutual coupling that its balance point is moved away from the relay when the current in the faulted feeder-section is away from the bus and the current in the parallel-connected sound feeder-section or sections is toward the bus.

9. A master circuit-interrupter protective system for a distribution system comprising a plurality of feeders normally connected in parallel, a common power-supply bus at each end of said feeders, and a source for each bus, so that power is normally fed into both ends of each feeder, said protective system comprising the combination, with said distribution system, of a master circuit-interrupter between each bus and its source, a feeder circuit-interrupter at each end of each feeder and connected between the feeder and the bus at that end, and fault-responsive relaying means at each end of each feeder, and operating means associated with said relaying means for effecting a sequence of operations whereby the master circuit-interrupters are both opened and subsequently the feeder-circuit interrupters at the two ends of the faulty feeder are opened, and subsequently the master circuit-interrupters are closed.

10. A master circuit-interrupter protective system for a distribution system comprising a plurality of feeders normally connected in parallel, a common power-supply bus at each end of said feeders, and a source for each bus, so that power is normally fed into both ends of each feeder, said protective system comprising the combination, with said distribution system, of a master circuit-interrupter between each bus and its source, a feeder circuit-interrupter at each end of said feeder and connected between the feeder and the bus at that end, and fault-responsive relaying means at each end of each feeder, and operating means associated with said relaying means for effecting a sequence of operations whereby, for faults adjacent to one end of one of the feeders, the master circuit-interrupter at the end nearest the fault is first opened, and subsequently the other master circuit-interrupter is opened and subsequently the feeder circuit-interrupters at the two ends of the faulty feeder are opened, and subsequently the master circuit-interrupters are closed.

ROBERT D. EVANS.
RICHARD T. EARLE.